United States Patent
Bomal et al.

(10) Patent No.: US 6,221,149 B1
(45) Date of Patent: *Apr. 24, 2001

(54) PROCESS FOR THE PREPARATION OF PRECIPITATED SILICA, NEW PRECIPITATED SILICAS CONTAINING ALUMINIUM AND THEIR USE FOR THE REINFORCEMENT OF ELASTOMERS

(75) Inventors: Yves Bomal, Paris; Yvonick Chevallier, Fontaines-Saint-Martin; Philippe Cochet, Lyons, all of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/148,908

(22) Filed: Aug. 24, 1998

Related U.S. Application Data

(62) Division of application No. 08/750,127, filed as application No. PCT/FR96/00463 on Mar. 28, 1996, now Pat. No. 5,876,494.

(30) Foreign Application Priority Data

Mar. 29, 1995 (FR) .................................................. 95 03675

(51) Int. Cl.⁷ .............................. C08K 3/36; C09C 1/28; C01B 33/12
(52) U.S. Cl. ........................ 106/492; 106/483; 423/335; 423/339; 524/492; 524/493
(58) Field of Search .................................. 106/481, 483, 106/492; 423/335, 339; 524/492, 493

(56) References Cited

U.S. PATENT DOCUMENTS

| | | | | |
|---|---|---|---|---|
| 4,040,858 | * | 8/1977 | Wason ................................... | 423/339 |
| 4,157,920 | * | 6/1979 | Wason et al. ......................... | 423/339 |
| 4,537,699 | * | 8/1985 | Jas ........................................ | 423/339 |
| 5,234,493 | * | 8/1993 | Dromard et al. .................... | 106/483 |
| 5,403,570 | * | 4/1995 | Chevallier et al. .................. | 423/339 |
| 5,852,099 | * | 12/1998 | Vanel ................................... | 423/339 |

FOREIGN PATENT DOCUMENTS

WO 95/09128 * 4/1995 (WO).

* cited by examiner

*Primary Examiner*—Michael Marcheschi
(74) *Attorney, Agent, or Firm*—Jean-Louis Seugnet

(57) ABSTRACT

The invention relates to a new process for the preparation of precipitated silica which has a very good dispersibility and very satisfactory reinforcing properties. It also relates to new precipitated silicas which are in the form of powder, of substantially spherical beads or of granules, these silicas being characterized by the fact that they have a CTAB specific surface of between 100 and 240 m²/g, a DOP oil uptake lower than 300 ml/100 g, a pore distribution such that the pore volume consisting of the pores whose diameter is between 175 and 275 Å represents less than 50% of the pore volume consisting of the pores of diameters which are smaller than or equal to 400 Å, a median diameter, after disintegration with ultrasound, smaller than 5 μm and an aluminum content of at least 0.35% by weight. The invention also relates to the use of the said silicas as reinforcing fillers for elastomers.

9 Claims, No Drawings ically, have a very good dispersibility
PROCESS FOR THE PREPARATION OF PRECIPITATED SILICA, NEW PRECIPITATED SILICAS CONTAINING ALUMINIUM AND THEIR USE FOR THE REINFORCEMENT OF ELASTOMERS This application is a division of U.S. application Ser. No. 08/750,127, filed on Mar. 30, 1997, now U.S. Pat. No. 5,876,494, which is an application under 35 U.S.C. Section 371 of International Application Number PCT/FR96/00463, filed on Mar. 28, 1996.

The present invention relates to a new process for the preparation of precipitated silica, to precipitated silicas which are in particular in the form of powder, of substantially spherical beads or of granules, and to their application as a reinforcing filler for elastomers.

It is known that precipitated silica has been employed for a long time as a white reinforcing filler in elastomers.

However, like any reinforcing filler, it is appropriate that it should be capable of, on the one hand, being handled and above all, on the other hand, of being easily incorporated into the mixtures.

It is known in general that, to obtain the optimum reinforcing properties conferred by a filler, it is appropriate that the latter should be present in the elastomer matrix in a final form which is both as finely divided as possible and distributed as homogeneously as possible. However, such conditions can be achieved only insofar as, on the one hand, the filler has a very good ability to be incorporated into the matrix during mixing with the elastomer (incorporability of the filler) and to disintegrate or to deagglomerate into the form of a very fine powder (disintegration of the filler) and as, on the other hand, the powder resulting from the abovementioned disintegration process can itself, in its turn, be perfectly and homogeneously dispersed in the elastomer (dispersion of the powder).

Moreover, for reasons of mutual affinities, silica particles have an unfortunate tendency, in the elastomer matrix, to agglomerate with each other. These silica/silica interactions have a detrimental consequence of limiting the reinforcing properties to a level that is substantially lower than that which it would be theoretically possible to expect if all the silica/elastomer interactions capable of being created during the mixing operation were actually obtained (this theoretical number of silica/elastomer interactions being, as is well known, directly proportional to the external surface of the silica employed).

Furthermore, in the raw state, such silica/silica interactions tend to increase the stiffness and the consistency of the mixtures, thus making them more difficult to process.

The problem arises of having available fillers which, while being capable of being relatively large in size, have a very good dispersibility in elastomers.

The aim of the present invention is to overcome the abovementioned disadvantages and to solve the abovementioned problem.

More precisely, its aim is especially to propose a new process for the preparation of precipitated silica which, advantageously, has a very good dispersibility (and disintegratability) and very satisfactory reinforcing properties, in particular which, when employed as a reinforcing filler for elastomers, imparts excellent rheological properties to the latter while providing them with good mechanical properties.

The invention also relates to precipitated silicas which, preferably, are in the form of powder, of substantially spherical beads or, optionally, of granules, and which, while being of relatively large size, have a very good dispersibility (and disintegratability) and very satisfactory reinforcing properties.

It relates finally, to the use of the said precipitated silicas as reinforcing fillers for elastomers.

In the description which follows, the BET specific surface is determined according to the Brunauer-Emmett-Teller method described in the Journal of the American Chemical Society, Vol. 60, page 309, February 1938 and corresponding to NFT standard 45007 (November 1987).

The CTAB specific surface is the outer surface determined according to NFT standard 45007 (November 1987) (5.12).

The DOP oil uptake is determined according to NFT standard 30-022 (March 1953) by using dioctyl phthalate.

The packing density (PD) is measured according to NFT standard 030100.

The pH is measured according to ISO standard 787/9 (pH of a suspension at a concentration of 5% in water).

Finally, it is specified that the given pore volumes are measured by mercury porosimetry, the pore diameters being calculated from the Washburn relationship with an angle of contact theta equal to 130° and a surface tension gamma equal to 484 dynes/cm (MICROMERITICS 9300 POROSIMETER®).

The dispersibility and the disintegratability of the silica according to the invention can be quantified by means of a specific disintegration test The disintegration test is carried out according to the following procedure:

the cohesion of the agglomerates is assessed by a particle size measurement (using laser scattering), performed on a silica suspension previously disintegrated by ultrasonic treatment; the disintegratability of the silica is thus measured (rupture of objects from 0.1 to a few tens of microns). The disintegration under ultrasound is performed with the aid of a VIBRACELL BIOBLOCK (500 W)® sonic transducer equipped with a probe 19 mm in diameter. The particle size measurement is performed by laser scattering on a Sympatec particle size analyser.

2 grams of silica are measured out into a specimen tube (height 6 cm and diameter 4 cm) and are made up to 50 grams by adding demineralized water, an aqueous suspension containing 4% of silica is thus produced, which is homogenized for 2 minutes by magnetic stirring. The disintegration under ultrasound is next performed as follows: with the probe immersed to a depth of 4 cm, the power is adjusted so as to obtain a needle deflection on the power dial indicating 20% (which corresponds to an energy of 120 watts/cm$^2$ dissipated by the end of the probe). The disintegration is performed for 420 seconds. The particle size measurement is then carried out after a known volume (expressed in ml) of the homogenized suspension has been introduced into the cell of the particle size analyser.

The value of the median diameter $\emptyset_{50}$ which is obtained is proportionally smaller the higher the disintegratability of the silica. The ratio (10×volume of dispersion introduced (in ml))/optical density of the suspension detected by the particle size analyser (this optical density is of the order of 20) is also determined. This ratio is an indication of the proportion of fines, that is to say of the content of particles smaller than 0.1 μm, which are not detected by the particle size analyser. This ratio, called the ultrasonic disintegration factor ($F_D$) is proportionally higher the higher the disintegratability of the silica.

One of the subjects of the invention is a process for the preparation of precipitated silica of the type including the reaction of a silicate with an acidifying agent, whereby a suspension of precipitated silica is obtained, followed by the separation and the drying of this suspension, in which the precipitation is carried out in the following manner (i) an initial base stock comprising a silicate of alkali metal M and an electrolyte is formed, the silicate concentration (expressed as $SiO_2$) in the said initial base stock being lower than 20 g/l, (ii) the acidifying agent is added to the said base stock until at least 5% of the quantity of $M_2O$ present in the said base stock is neutralized, (iii) acidifying agent and a silicate of alkali metal M are added simultaneously to the reaction mixture such that the ratio of the quantity of silicate added (expressed as $SiO_2$) (the quantity of silicate present in the initial base stock (expressed as $SiO_2$, called the degree of consolidation, is greater than 4 and at most 100, characterized in that the said process includes one of the following two operations (a) or (b):

(a) at least one aluminium compound A and then a basic agent are added to the reaction mixture after stage (iii), the said separation comprising a filtration and a disintegration of the cake originating from this filtration, the said disintegration being performed in the presence of at least one aluminium compound B, (b) a silicate and at least one aluminium compound A are added simultaneously to the reaction mixture after stage (iii) and, when the said separation comprises a filtration and a disintegration of the cake originating from this filtration, the disintegration is preferably performed in the presence of at least one aluminium compound B.

It has thus been found that the introduction of aluminium—this being according to a particular method—combined with a low silicate concentration (expressed as $SiO_2$) and of electrolyte in the initial base stock and at an appropriate degree of consolidation during the simultaneous addition stage constitutes an important condition for imparting their excellent properties to the products obtained, especially very satisfactory reinforcing properties.

It should be noted, in general, that the process concerned is a process for the synthesis of precipitated silica, that is to say that an acidifying agent is reacted with a silicate in very special conditions.

The choice of the acidifying agent and of the silicate is made in a manner which is well known per se.

It may be recalled that the acidifying agent generally employed is a strong inorganic acid such as sulphuric acid, nitric acid or hydrochloric add, or an organic acid such as acetic acid, formic acid or carbonic acid.

The acidifying agent may be dilute or concentrated; its normality may be between 0.4 and 36 N, for example between 0.6 and 1.5 N.

In particular, in the case where the acidifying agent is sulphuric acid, its concentration may be between 40 and 180 g/l, for example between 60 and 130 g/l.

It is possible, furthermore, to employ as a silicate any common form of silicates such as metasilicates, disilicates and advantageously an alkali metal silicate, especially sodium or potassium silicate.

The silicate may exhibit a concentration, expressed as silica, of between 40 and 330 g/l, for example between 60 and 300 g/l, in particular between 60 and 250 g/l.

In general, sulphuric acid is employed as the acidifying agent, and sodium silicate as the silicate.

In the case where sodium silicate is employed, the latter generally exhibits an $SiO_2/Na_2O$ weight ratio of between 2 and 4, for example between 3.0 and 3.7.

Insofar as the process of preparation of the invention is more particularly concerned, the precipitation is done in a specific manner according to the following stages.

First of all a base stock is formed which includes some silicate and an electrolyte (stage (i)). The quantity of silicate present in the initial base stock advantageously represents only a part of the total quantity of silicate introduced into the reaction.

According to a characteristic of the process of preparation according to the invention, the silicate concentrate in the initial base stock is (higher than 0 g/l, and) lower than 20 g of $SiO_2$ per liter. This concentration may be at most 11 g/l and, optionally, at most 8 g/l.

Especially when the separation performed subsequently during the process according to the invention includes a filtration performed by means of a filter press (and more particularly in the case where it is desired to prepare silicas which have a CTAB specific surface of at least 140 $m^2/g$), this concentration may be at least 8 g/l, in particular between 10 and 15 g/l, for example between 11 and 15 g/l; the drying used later in the process according to the invention may be performed by spraying by means of a multinozzle sprayer.

The base stock may include an electrolyte. Nevertheless, preferably, no electrolyte is employed in the course of the process of preparation according to the invention; in particular, the initial base stock preferably does not include any electrolyte.

The term electrolyte is understood here in its normal accepted meaning, that is to say that it denotes any ionic or molecular substance which, when in solution, decomposes or dissociates to form ions or charged particles. An electrolyte which may be mentioned is a salt from the group of the alkali and alkaline-earth metal salts, especially the salt of the metal of the starting silicate and of the acidifying agent, for example sodium sulphate in the case of the reaction of a sodium silicate with sulphuric acid.

The second stage consists in adding the acidifying agent to the base stock of composition described above (stage (ii)).

Thus, in this second stage the acidifying agent is added to the said initial base stock until at least 5%, preferably at least 50%, of the $M_2O$ quantity present in the said initial base stock is neutralized.

In this second stage the acidifying agent is preferably added to the said initial base stock until 50 to 99% of the quantity of $M_2O$ present in the said initial base stock is neutralized.

Once the desired value of neutralized $M_2O$ quantity is reached, a simultaneous addition (stage (iii)) is then undertaken, of acidifying agent and of a quantity of silicate of alkali metal M such that the degree of consolidation, that is to say the ratio of the quantity of silicate added (expressed as $SiO_2$)/the quantity of silicate present in the initial base stock (expressed as $SiO_2$) is higher than 4 and at most 100.

According to an alternative form of the process of the invention this simultaneous addition is undertaken, of acidifying agent and of a quantity of silicate of alkali metal M such that the degree of consolidation is more particularly between 12 and 100, preferably between 12 and 50, especially between 13 and 40.

According to another alternative form of the process of the invention this simultaneous addition is undertaken, of acidifying agent and of a quantity of silicate of alkali metal M such that the degree of consolidation is rather higher than 4 and lower than 12, preferably between 5 and 11.5, especially between 7.5 and 11. This alternative form is, in general, used when the silicate concentration in the initial base stock is at least 8 g/l, in particular between 10 and 15 g/l, for example between 11 and 15 g/l.

Throughout the stage (iii) the quantity of acidifying agent which is added is preferably such that 80 to 99%, for example 85 to 97%, of the quantity of $M_2O$ which is added is neutralized.

In stage (iii) it is possible to undertake the simultaneous addition of acidifying agent and of silicate at a first pH plateau of the reaction mixture, $pH_1$, and then at a second pH plateau of the reaction mixture, $pH_2$, such that $7<pH_2<pH_1<9$.

According to an essential characteristic of the process of preparation according to the invention, the latter includes one of the two operations, (a) or (b) mentioned above, that is to say:

(a) at least one aluminum compound A and then a basic agent are added, after stage (iii) to the reaction mixture, the separation used in the process comprising a filtration and a disintegration of the cake originating from this filtration, the said disintegration being performed in the presence of at least one aluminum compound B, or (b) a silicate and at least one aluminum compound A are added simultaneously, after stage (iii) to the reaction mixture and, when the separation used in the process comprises a filtration and a disintegration of the cake originating from this filtration, the disintegration is preferably performed in the presence of at least one aluminum compound B.

In a first alternative form of the process of preparation according to the invention (that is to say when the latter includes the operation (a)), the following successive stages are performed advantageously after having carried out the precipitation according to the stages (i), (ii) and (iii) described above:

(iv) at least one aluminum compound A is added to the reaction mixture (that is to say to the reaction suspension or slurry obtained), (v) a basic agent is added to the reaction mixture preferably until a pH value of the reaction mixture of between 6.5 and 10, in particular between 7.2 and 8.6, is obtained, (vi) acidifying agent is added to the reaction mixture, preferably until a pH value of the reaction mixture of between 3 and 5, in particular between 3.4 and 4.5, is obtained.

After the simultaneous addition of stage (iii) it may then be advantageous to perform a maturing of the reaction mixture, it being possible for this maturing to last, for example, from 1 to 60 minutes, in particular from 3 to 30 minutes.

In this first alternative form it is desirable, between stage (iii) and stage (iv), and especially before the said optional maturing, to add an additional quantity of acidifying agent to the reaction mixture. This addition is generally done until a pH value of the reaction mixture of between 3 and 6.5, in particular between 4 and 6, is obtained.

The acidifying agent employed during this addition is generally identical with that employed during stages (ii), (iii) and (vi) of the first alternative form of the process of preparation according to the invention.

A maturing of the reaction mixture is usually performed between stage (v) and (vi), for example for 2 to 60 minutes, in particular for 5 to 45 minutes.

Similarly, a maturing of the reaction mixture is in most cases performed after stage (vi), for example for 2 to 60 minutes, in particular for 5 to 30 minutes.

The basic agent employed during stage (iv) may be a solution of aqueous ammonia or, preferably, a solution of sodium hydroxide (or soda).

In a second alternative form of the process of preparation according to the invention (that is to say when the latter includes the operation (b)), a stage (iv) is performed after the stages (i), (ii) and (iii) described previously, which consists in adding a silicate and at least one aluminum compound A simultaneously to the reaction mixture.

After the simultaneous addition of stage (iv) it may then be advantageous to perform a maturing of the reaction mixture, it being possible for this maturing to last, for example, from 2 to 60 minutes, in particular from 5 to 30 minutes.

In this second alternative form it is desirable, after stage (iv), and especially after this optional maturing, to add an additional quantity of acidifying agent to the reaction mixture. This addition is generally done until a pH value of the reaction mixture of between 3 and 6.5, in particular between 4 and 6, is obtained.

The acidifying agent employed during this addition is generally identical with that employed during stages (ii) and (iii) of the second alternative form of the process of preparation according to the invention.

A maturing of the reaction mixture is usually performed after this addition of acidifying agent, for example for 1 to 60 minutes, in particular for 3 to 30 minutes.

The aluminum compound A employed in the process of preparation according to the invention is generally an organic or inorganic aluminium salt.

By way of examples of an organic salt there may be mentioned especially the salts of carboxylic or polycarboxylic acids, like the salts of acetic, citric, tartaric or oxalic acid.

By way of examples of an inorganic salt there may be mentioned especially halides and oxyhalides (like chlorides and oxychlorides), nitrates, phosphates, sulphates and oxysulphates.

In practice, the aluminum compound A may be employed in the form of a solution, generally aqueous.

An aluminum sulphate is preferably employed as aluminium compound A.

The temperature of the reaction mixture is generally between 60 and 98° C.

According to an alternative form of the invention the reaction is performed at a constant temperature of between 70 and 96° C.

According to another alternative form of the invention the temperature at the end of the reaction is higher than the temperature at the beginning of reaction; the temperature at the beginning of the reaction is thus maintained preferably between 70 and 96° C. and the temperature is then raised over a few minutes, preferably up to a value of between 75 and 98° C., which value it is maintained until the end of the reaction; the operations (a) or (b) are thus usually performed at this constant temperature value.

At the outcome of the stages which have just been described a silica slurry is obtained which is then separated (liquid-solid separation).

In the first alternative form of the process of the preparation according to the invention (that is to say when the latter includes the operation (a)), this separation comprises a filtration (followed by washing if necessary) and a disintegration, the said disintegration being performed in the presence of at least one aluminium compound B and, preferably, in the presence of an acidifying agent as described above (in this latter case the aluminum compound B and the acidifying agent are advantageously added simultaneously).

The disintegration operation, which may be carried out, for example, by passing the filter cake through a mill of the colloid or bead type, makes it possible in particular to lower the viscosity of the suspension to be subsequently dried.

In the second alternative form of the process of preparation according to the invention (that is to say when the latter includes the operation (b)), the separation also comprises, in general, a filtration (followed by washing if necessary) and a disintegration, the said disintegration being preferably performed in the presence of at least one aluminum compound B and, in general, in the presence of an acidifying agent as described above (in this latter case the aluminum compound B and the acidifying agent are advantageously added simultaneously).

The aluminum compound B is usually different from the aluminium compound A mentioned above and generally consists of an alkali metal, especially potassium, or, very preferably, sodium, aluminate.

The quantities of the aluminum compounds A and B employed in the process of preparation according to the invention are preferably such that the precipitated silica prepared contains at least 0.35%, in particular at least 0.45%, for example between 0.50 and 1.50%, or even between 0.75 and 1.40%, by weight of aluminum.

The separation used in the process of preparation according to the invention usually includes a filtration performed by means of any suitable method, for example by means of a belt filter, a rotary vacuum filter or, preferably, a filter press.

The suspension of precipitated silica thus recovered (filter cake) is then dried.

This drying may be done according to any method that is known per se.

The drying is preferably done by spraying.

Any suitable type of sprayer may be employed for this purpose, especially a turbine, nozzle, liquid-pressure or two-fluid sprayer.

The drying is, for example, performed by spraying by means of a multinozzle sprayer especially when the silicate concentration in the initial base stock is at least 8 g/l (and lower than 20 g/l), in particular of between 10 and 15 g/l (and more particularly in the case where it is desired to prepare silicas which have a CTAB specific surface of at least 140 $m^2/g$).

According to one embodiment of the invention, the suspension to be dried has a solids content higher than 15% by weight, preferably higher than 17% by weight and, for example, higher than 20% by weight. The drying is then preferably performed by means of a multinozzle sprayer.

The precipitated silica capable of being obtained according to this embodiment of the invention and preferably by using a filter press is advantageously in the form of substantially spherical beads, preferably of a mean size of at least 80 $\mu$m.

It should be noted that dry material for example silica in pulverulent form may be also added to the filter cake after the filtration, at a subsequent stage of the process.

At the end of the drying, a stage of milling may be undertaken on the product recovered, especially on the product obtained by drying a suspension which has a solids content higher than 15% by weight The precipitated silica which is then obtainable is generally in the form of a powder, preferably with a mean size of at least 15 $\mu$m, in particular between 15 and 60 $\mu$m, for example between 20 and 45 $\mu$m.

The milled products with the desired particle size can be separated from any nonconforming products by means, for example, of vibrating screens which have appropriate mesh sizes, and the nonconforming products thus recovered can be returned to the milling.

Similarly, according to another embodiment of the invention, the suspension to be dried has a solids content of at most 15% by weight. The drying is then generally performed by means of a turbine sprayer. The precipitated silica which is then obtainable according to this embodiment of the invention and preferably by using a rotary vacuum filter is generally in the form of a powder, preferably with a mean size of at least 15 $\mu$m, in particular between 30 and 150 $\mu$m, for example between 45 and 120 $\mu$m.

Finally, the product which has been dried (especially from a suspension which has a solids content of at most 15% by weight) or milled can, according to another embodiment of the invention, be subjected to an agglomeration stage.

Agglomeration is here intended to mean any process which enables finely divided objects to be bonded together in order to bring them into the form of objects of larger size and which are mechanically stronger.

These processes are especially direct compression, wet-route granulation (that is to say with the use of a binder such as water, silica slurry, etc.), extrusion and, preferably, dry compacting.

When this last technique is used it may be found advantageous, before starting the compacting, to deaerate the pulverulent products (an operation which is also called predensifying or degassing), so as to remove the air included therein and to ensure a more uniform compacting.

The precipitated silica which can be obtained according to this embodiment of the invention is advantageously in the form of granules, preferably at least 1 mm in size, in particular between 1 and 10 mm.

At the end of the agglomeration stage the products may be classified to a desired size, for example by screening, and then packaged for their future use.

The powders, as well as the beads, of precipitated silica which are obtained by the process according to the invention thus offer the advantage, among others, of providing access to granules such as those mentioned above, in a simple, efficient and economical manner, especially by conventional forming operations, such as, for example, granulation or compacting, without the latter resulting in degradation capable of masking, or even annihilating, the good intrinsic properties associated with these powders or these beads, as may be the case in the prior art when using conventional powders.

Other subjects of the invention consist of new precipitated silicas which have an excellent dispersibility (and disintegratability) and very satisfactory reinforcing properties, in particular which, when employed as a reinforcing filler for elastomers, impart good rheological properties to the latter while providing them with very satisfactory mechanical properties.

Thus, a new precipitated silica is now proposed, according to the invention, characterized in that it has:
  a CTAB specific surface of between 100 and 240 $m^2/g$,
  a DOP oil uptake lower than 300 ml/100 g, preferably between 200 and 295 ml/100 g,
  a median diameter ($\emptyset_{50}$), after disintegration with ultrasound, smaller than 5 $\mu$m,
  a pore distribution such that the pore volume consisting of the pores whose diameter is between 175 and 275 Å represents less than 50% of the pore volume consisting of the pores of diameters which are smaller than or equal to 400 Å, an aluminium content of at least 0.35% by weight, preferably at least 0.45% by weight.

The silica according to the invention preferably has an aluminium content of between 0.50 and 1.50% by weight; this content may be especially between 0.75 and 1.40% by weight.

One of the characteristics of the silica according to the invention, lies in the distribution, or spread, of the pore volume and especially in the distribution of the pore volume which is produced by the pores of diameters smaller than or equal to 400 Å. This latter volume corresponds to the useful pore volume of the fillers which are employed in the reinforcement of elastomers. Analysis of the porograms shows that the silica according to a particular method of the invention then has a pore distribution such that the pore volume consisting of the pores those diameter is between 175 and 275 Å represents less than 50%, for example less than 40%, of the pore volume consisting of the pores of diameters smaller than or equal to 400 Å.

According to a first particular embodiment of the invention the precipitated silica has:

a CTAB specific surface of between 140 and 240 $m^2/g$, preferably between 140 and 225 $m^2/g$, in particular between 150 and 225 $m^2/g$, for example between 150 and 200 $m^2/g$, an ultrasonic disintegration factor ($F_D$) higher than 5.5 ml, in particular higher than 11 ml, for example higher than 12.5 ml.

It then generally has a BET specific surface of between 140 and 300 $m^2/g$, in particular between 140 and 280 $m^2/g$, for example between 150 and 270 $m^2/g$.

According to a second particular embodiment of the invention the precipitated silica has:

a CTAB specific surface of between 100 and 140 $m^2/g$, preferably between 100 and 135 $m^2/g$, a median diameter ($\varnothing_{50}$), after disintegration with ultrasound, smaller than 4.5 $\mu$m, in particular smaller than 4 $\mu$m, for example smaller than 3.8 $\mu$m.

It then generally has a BET specific surface of between 100 and 210 $m^2/g$, especially between 100 and 180 $m^2/g$.

According to an alternative form of the invention the silica has a BET specific surface/CTAB specific surface ratio of between 1.0 and 1.2, that is to say that it preferably has a very low microporosity.

According to another alternative form of the invention the silica has a BET specific surface/CTAB specific surface ratio higher than 1.2, for example between 1.21 and 1.4, that is to say that it exhibits a relatively high microporosity.

The pH of the silica according to the invention is generally between 6.5 and 7.5, for example between 6.7 and 7.3.

The silicas according to the invention may be in the form of powders, of substantially spherical beads or, optionally, of granules, and are characterized particularly by the fact that, while being relatively large in size, they have a very good dispersibility and disintegratability and very satisfactory reinforcing properties. They thus exhibit a dispersibility and disintegratability that are advantageously superior to that of the silicas of the prior art, which are identical or closely related in specific surface and identical or closely related in size.

The silica powders according to the invention preferably have a mean size of at least 15 $\mu$m; the latter is, for example, between 15 and 60 $\mu$m (especially between 20 and 45 $\mu$m) or between 30 and 150 $\mu$m (especially between 45 and 120 $\mu$m).

They have, preferably, a DOP oil uptake of between 240 and 290 ml/100 g.

The packing density (PD) of the said powders is generally at least 0.17 and, for example, between 0.2 and 0.3.

The said powders generally have a total pore volume of at least 2.5 $cm^3/g$ and, more particularly, of between 3 and 5 $cm^3/g$.

They make it possible in particular to obtain a very good compromise between processing and mechanical properties in the vulcanized state.

They also constitute preferred precursors for the synthesis of granulates as described later.

The substantially spherical beads according to the invention preferably have a mean size of at least 80 $\mu$m.

According to certain alternative forms of the invention, this mean bead size is at least 100 $\mu$m, for example at least 150 $\mu$m; it is generally at most 300 $\mu$m and preferably lies between 100 and 270 $\mu$m. This mean size is determined according to NF standard X 11507 (December 1970) by dry screening and determination of the diameter corresponding to a cumulative oversize of 50%.

They preferably have a DOP oil uptake of between 240 and 290 ml/100 g.

The packing density (PD) of the said beads (or prills) is generally at least 0.17 and, for example, between 0.2 and 0.34.

They usually have a total pore volume of at least 2.5 $cm^3/g$ and, more particularly, of between 3 and 5 $cm^3/g$.

As indicated above, such a silica in the form of substantially spherical beads which are advantageously solid, homogeneous and low in dust and have good pourability, has an excellent disintegratability and dispersibility. In addition, it exhibits good reinforcing properties. Such a silica also constitutes a preferred precursor for the synthesis of the powders and granules according to the invention.

Such a silica in the form of substantially spherical beads constitutes a highly advantageous alternative form of the invention.

The dimensions of the granules according to the invention are preferably at least 1 mm, in particular between 1 and 10 mm, along the axis of their largest dimension (length).

They preferably have a DOP oil uptake of between 200 and 260 ml/100 g.

The said granules may be of the most diverse shape. The shapes which may be especially mentioned by way of example are the spherical, cylindrical, parallelepipedal, tablet, flake, pellet and extrudate of circular or polylobar section.

The packing density (PD) of the said granules is generally at least 0.27 and may range up to 0.37.

They generally have a total pore volume of at least 1 $cm^3/g$ and, more particularly, between 1.5 and 2 $cm^3/g$.

The silicas according to the invention, especially in the form of powder or of substantially spherical beads or granules are preferably prepared according to one of the appropriate alternative forms of the process of preparation in accordance with the invention and described above.

The silicas according to the invention or prepared by the process according to the invention find a particularly advantageous application in the reinforcement of natural or synthetic elastomers. They impart excellent rheological properties to these elastomers while providing them with good mechanical properties and, in general, good resistance to abrasion. In addition, these elastomers are preferably less liable to heating.

The following examples illustrate the invention without, however, limiting its scope.

EXAMPLE 1

The following were introduced into a stainless steel reactor provided with a stirring system using propellers and with heating using a jacket:

733 liters of water, and 46.5 liters of a solution of sodium silicate ($SiO_2/Na_2O$ weight ratio of 3.4) with a concentration expressed as silica of 235 g/l.

The concentration of silicate expressed as $SiO_2$ in the initial base stock is thus 14 g/l. The temperature of the solution was then raised to 80° C. while being kept stirred. The entire reaction was carried out at 80° C. and with stirring. Dilute sulphuric acid with a density of 1.050 at 20° C. was then introduced at a rate of 5.4 l/min for a period of 9 minutes; following addition, the neutralisation ratio in the base stock was 78%, i.e., 78% of the quantity of $Na_2O$ present in the initial base stock had been neutralised.

Simultaneous introduction of a sodium silicate solution of the type described above at a rate of 4.3 l/min and of dilute sulphuric acid also of the type described above and at a rate which was regulated sa as to maintain a pH:

of 8.5±0.1 for the first 55 minutes, then of 7.8±0.1 for the final 35 minutes, in reaction medium, was then effected over 90 minutes.

During this simultaneous addition step, the instantaneous neutralisation ratio was 94%, i.e., 94% of the quantity of $Na_2O$ added (per min) was neutralised.

The consolidation ratio following simultaneous addition was 8.3.

A solution of aluminum sulphate of density at 20° C. equal to 1.2 is then introduced into the reaction medium at a rate of 4.6 l/min for 6 minutes. At the end of this addition, 18% strength concentrated soda is introduced into the reaction medium at a rate of 3.8 l/min until the pH of the reaction medium is equal to 8.0.

The introduction of soda is then stopped and maturing of the reaction medium is undertaken at a temperature of 80° C. for 20 minutes.

Dilute sulphuric acid with a density of 1.050 at 20° C. is then introduced at a rate of 4.0 l/min until the pH of the reaction medium is equal to 3.7.

The introduction of acid is then stopped and maturing of the reaction medium is undertaken at a temperature of 80° C. for 10 minutes.

The entire reaction period is 159 minutes.

A slurry of precipitated silica is thus obtained which is filtered and washed by means of a filter press.

The cake obtained is next fluidized by mechanical and chemical action (simultaneous addition of sulphuric acid and of a quantity of sodium aluminate corresponding to an $Al/SiO_2$ weight ratio of 0.25%). After this disintegration operation the resulting slurry, with a pH equal to 6.5 and a loss of ignition equal to 79.0% (and hence a solids content of 21.0% by weight), is sprayed by means of a nozzle sprayer.

The characteristics of the silica P1 obtained in the form of substantially spherical beads (in accordance with the invention) are as follows:

| | |
|---|---|
| CTAB specific surface | 150 m²/g |
| BET specific surface | 177 m²/g |
| DOP oil uptake | 292 ml/100 g |
| Aluminum weight content | 0.85% |
| Pore volume V1 represented by the pores of d ≦ 400 Å | 0.97 cm³/g |
| Pore volume V2 represented by the pores 175 Å ≦ d ≦ 275 Å | 0.42 cm³/g |
| V2/V1 ratio | 43% |
| pH | 6.9 |
| Mean particle size | 245 μm |

The silica P1 is subjected to the disintegration test as defined above in the description.

After disintegration with ultrasound it has a median diameter ($\varnothing_{50}$) of 2.5 μm and an ultrasonic disintegration factor ($F_D$) of 18 ml.

The characteristics of the silica prepared in Example 1 and those of a commercial silica sold in the form of substantially spherical beads by RHONE-POULENC CHIMIE as a reinforcing filler for elastomers, in this case the silica ZEOSYL® 175 MP (referred to as MP1), are reported in Table 1 below.

TABLE 1

| | MP1 | P1 |
|---|---|---|
| $S_{CTAB}$ (m²/g) | 162 | 150 |
| $S_{BET}$ (m²/g) | 175 | 177 |
| DOP (ml/100 g) | 280 | 292 |
| Al (%) | 0.25 | 0.85 |
| V1 (cm³/g) | 0.95 | 0.97 |
| V2 (cm³/g) | 0.45 | 0.42 |
| V2/V1 (%) | 47 | 43 |
| pH | 6.5 | 6.9 |
| Mean size (μm) | 265 | 245 |
| $\phi_{50}$ (μm) | 9.1 | 2.5 |
| $F_D$ (ml) | 2.1 | 18 |

EXAMPLE 2

This example illustrates the use and the behaviour of a silica according to the invention and of a silica not in accordance with the invention in a formulation for industrial rubber.

The following formulation is employed (the parts are expressed by weight):

| | |
|---|---|
| S.B.R. 1955 S 25 rubber[1] | 50 |
| B.R. 1220 rubber[2] | 25 |
| Natural rubber | 25 |
| Silica | 51 |
| Active ZnO[3] | 1.8 |
| Stearic acid | 0.35 |
| 6PPD[4] | 1.45 |
| CBS[5] | 1.1 |
| DPG[6] | 1.4 |
| Sulphur[7] | 0.9 |
| Silane X50S[8] | 8.15 |

[1]Styrene butadiene copolymer solution type 1955 S 25
[2]Butadiene polymer type 1220
[3]Rubber grade zinc oxide
[4]N-(1,3-Dimethylbutyl)-N'-phenyl-p-phenylenediamine
[5]N-Cyclohexyl 2-benzothiazyl sulphenamide
[6]Diphenyl guanidine
[7]Vulcanizing agent
[8]Silica/rubber coupling agent (product marketed by Degussa)

The formulations are prepared in the following manner:

The following are introduced into an internal mixer (Banbury type), in this order and at the times and temperatures of the mixing which are shown in brackets:

S.B.R. 1955 S 25, B.R. 1220 and natural rubber ($t_0$)(60° C.)

the X50S and ⅔ of the silica ($t_0$+1 min)(807° C.)

the ZnO, the stearic acid, the 6PPD and ⅓ of the silica ($t_0$+2 min)(100° C.)

The discharge from the mixer (mix drop) takes place when the chamber temperature reaches 165° C. (that is to say at approximately $t_0$+5 min 10 s). The mix is introduced onto a roll mill, the rolls being kept at 30° C., to be calendered thereon. The CBS, the DPG and the sulphur are introduced onto this mill.

After homogenization and three fine passes the final mixture is calendered into the form of sheets from 2.5 to 3 mm in thickness.

The results of the tests are the following:

1—Rheological Properties

The measurements are carried out on the formulations in the raw state.

The results are reported in Table 11 below. The apparatus employed for conducting the measurements has been shown.

TABLE II

|  | MP1 | P1 |
|---|---|---|
| MOONEY consistency[1] | 130 | 90 |
| Min. torque (in.lb)[2] | 26.5 | 19.6 |

[1]MOONEY MV 2000E viscometer (Mooney large (1 + 4) measurement at 100° C.)
[2]MONSANTO 100 S rheometer The formulation obtained from the silica according to the invention results in the lowest values.

This expresses a greater processibility of the mixes prepared from the silica according to the invention, in particular in respect of the extrusion and calendering operations which are often carried out during the manufacture of elastomer compositions (lower energy expenditure for processing the mix, greater ease of injection during the compounding, less die swell during extrusion, less shrinkage on calendering, . . . ).

2—Mechanical Properties

The measurements are carried out on vulcanized formulations.

The vulcanization is carried out by heating the formulations to 150° C. for 40 minutes.

The following standards were employed:
(i) tensile tests (moduli, tensile strength) NFT 466002 or ISO 37-1977
(ii) tests of abrasion resistance DIN 53-516

The results obtained are listed in Table III below.

TABLE III

|  | MP1 | P1 |
|---|---|---|
| 300% modulus/100% modulus | 3.4 | 5.0 |
| Tensile strength (MPa) | 17.1 | 20.9 |
| Abrasion resistance (mm³)[1] | 58 | 45 |

[1]the measured value is the loss on abrasion: the lower it is, the better the abrasion resistance.

These last results demonstrate the good reinforcing effect conferred by the silica according to the invention.

Thus, while resulting in more satisfactory rheological properties, the silica according to the invention provides mechanical properties which are better than those obtained with the silica of the prior art.

On the one hand, the silica according to the invention produces a 300% modulus/100% modulus ratio that is greater than the ratio obtained with the silica of the prior art, which is a proof of better dispersion of the silica within the rubber matrix.

On the other hand, the high reinforcing power of the silica according to the invention is confirmed by the high value obtained for the tensile strength.

At last, with regard to the abrasion resistance, it can be seen that the loss by abrasion is substantially reduced (about 20%) in relation to the comparative silica.

3—Dynamic Properties

The measurements are carried out on vulcanized formulations.

The vulcanization is obtained by heating the formulations to 150° C. for 40 minutes. The results (illustrating the tendency to heat up) are reported in Table IV below (the lower the value, the lower the tendency to heat up). The apparatus employed for conducting the measurements has been shown.

TABLE IV

|  | MP1 | P1 |
|---|---|---|
| Internal heating (° C.)[1] | 90 | 78 |

[1]GOODRICH flexometer

The tendency to heat up obtained from the silica according to the invention is low.

What is claimed is:

1. A precipitated silica having:

a CTAB specific surface of between 100 and 240 m²/g, a DOP oil uptake lower than 300 ml/100 g, pores, a pore volume and a pore distribution such that the pores, whose diameter is between 175 and 275 Å, represent a pore volume less than 50% of the pore volume of the pores of diameters which are smaller than or equal to 400 Å, and an aluminum content of at least 0.45% by weight, said silica being in the form of spherical beads with a mean size of at least 80 μm, powder with a mean size of at least 15 μm, or granules of at least 1 mm in size, wherein after disintegration of the silica form with ultrasound, the median diameter of said silica is smaller than 5 μm.

2. A silica according to claim 1, wherein the aluminum content is between 0.50 and 1.50% by weight.

3. A silica according to claim 1, further having an ultrasonic disintegration factor ($F_D$) higher than 5.5 ml.

4. A silica according to claim 1, wherein the CTAB specific surface is between 140 and 240 m²/g.

5. A silica according to claim 3, further having a BET specific surface of between 140 and 300 m²/g.

6. A silica according to claim 1, wherein the CTAB specific surface is between 100 and 140 m²/g, and the median diameter ($Ø_{50}$), after disintegration with ultrasound, is smaller than 4.5 μm.

7. A silica according to claim 6, further having a BET specific surface of between 100 and 210 m²/g.

8. A silica according to claim 1, wherein the silica is in the form of spherical beads having a mean size of at least 150 μm.

9. An elastomer comprising as reinforcing filler a silica according to claim 1.

* * * * *